United States Patent Office 2,905,570
Patented Sept. 22, 1959

2,905,570

METHOD OF PROTECTING MATERIAL AGAINST THE EFFECTS OF LIGHT

John O. Hawthorne, Pittsburgh, and Myron H. Wilt, Monroeville, Pa., assignors to United States Steel Corporation, a corporation of New Jersey No Drawing. Application December 4, 1957
Serial No. 700,545

5 Claims. (Cl. 117—33.3)

This invention relates to a method of inhibiting the deteriorating effects of light on various materials, either textile, fibrous or plastic, or the coating or coloring applied thereto, i.e., dyes, paints and the like.

The fading effect of light on the color of dyes and paints is well known. In addition, light causes deteriorating physical or chemical changes in other materials such as resins. We have invented a method of protecting paper, cloth and synthetic-resin materials against the effects of light, which is inexpensive and easy to practice. The preferred procedure is to introduce into or apply to the material to be protected a small amount of 9-oxa-9,10-dihydrophenanthrene-10-one or 2,2′-biphenyl lactone. This lactone may be dissolved in a volatile organic solvent such as acetone, alcohol or aromatic hydrocarbon, and sprayed or brushed on the material to be protected, e.g., paper, cloth or the like. A solution of from .25 to 5.0%, preferably about 1%, will suffice.

We may also dissolve said lactone in the solvent used in mixing paint or lacquer made from addition polymers, before adding it to the other materials. The amount of the lactone should be such as to give the concentrations mentioned above in the finished paint or lacquer.

While the lactone is insoluble in water, it may be dispersed therein by the aid of a wetting agent such as dioctyl sodium sulfosuccinate (a product of American Cyanamid Company designated "Aerosol OT") and the dispersion applied in any convenient manner to the surface to be protected. The concentration should be as given above.

The structural formula of the lactone 9-oxa-9,10-dihydrophenanthrene-10-one is:

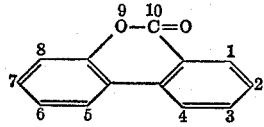

Other names applicable thereto are:

3,4-benzocoumarin;
6-oxo-6H-dibenzo [b,d] pyran; and
Lactone of 2-hydroxy-2′-biphenylcarboxylic acid.

A 1% solution of the ammonium salt of 2-hydroxy-2′-biphenylcarboxylic acid in 14% ammonium hydroxide may be applied to material and converted into the lactone by heating to 125° C. In coating surfaces, it is desirable to apply from .01 to .5 pound of the lactone per thousand square feet.

The lactone may be dissolved in the ordinary solvents used in making lacquer from addition polymers such as polyvinyl chloride. It is used in amounts from .25 to 2% by weight of the solids content of the lacquer, preferably about 1%. The presence of the lactone inhibits yellowing of the lacquer under strong mercury-vapor radiation.

Polyisoamyl methacrylate lacquer may be inhibited from undesired polymerization on exposure to light, with loss of solubility, by introducing .5% by weight of the lactone thereto with the solvent ordinarily employed.

Our invention has the advantage that the lactone employed is relatively cheap, is insoluble in water and odorless, has low volatility and is relatively unaffected by heat and ultraviolet radiation. Thus weathering by light, oxidation and water washing is negligible. The lactone is highly soluble in organic solvents but does not discolor them. It imparts greater light stability to synthetic-resin lacquers than other compounds which have been used.

While we have disclosed herein the preferred practice of our invention, we intend to cover as well any change or modification therein which may be made without departing from the spirit and scope of the invention.

We claim:

1. A method of protecting addition polymers against the deteriorating effects of light which consists in incorporating in the polymer about 1% of 9-oxa-9,10-dihydrophenanthrene-10-one.

2. A method of protecting material selected from the group consisting of paper, cloth and synthetic resins against the deteriorating effects of light which consists in applying to the material a coating containing about 1% of 9-oxa-9,10-dihydrophenanthrene-10-one.

3. A method of protecting material against the deteriorating effects of light which consists in applying to the material a coating of a solution containing from .25 to 5% of 9-oxa-9,10-dihydrophenanthrene-10-one.

4. A method of protecting material against the deteriorating effects of light which consists in applying to the material a coating of a water dispersion containing from .25 to 5% of 9-oxa-9,10-dihydrophenanthrene-10-one.

5. A method of protecting material against the deteriorating effects of light which consists in applying to the material a coating of an aqueous solution of a salt of 2-hydroxy-2′-biphenylcarboxylic acid and heating the material to about 125° C., thereby converting the salt to 9-oxa-9,10-dihydrophenanthrene-10-one.

References Cited in the file of this patent

UNITED STATES PATENTS

| | | |
|---|---|---|
| 1,958,714 | Richardson et al. | May 15, 1934 |
| 1,994,596 | Staud | Mar. 19, 1935 |
| 2,043,805 | Murray | June 9, 1936 |
| 2,704,286 | Baum | Mar. 15, 1955 |

OTHER REFERENCES

Goodwin et al.: Arch. Biochem., vol. 27 (1950), pp. 152–173 (p. 161 relied on).